C. S. FRANKLIN.

AERIAL CONDUCTOR FOR WIRELESS TELEGRAPHY.

APPLICATION FILED JULY 23, 1920.

Reissued Feb. 15, 1921. 15,040.

2 SHEETS—SHEET 1.

Inventor
CHARLES S. FRANKLIN

By his Attorney
Ira J Adams

C. S. FRANKLIN.

AERIAL CONDUCTOR FOR WIRELESS TELEGRAPHY.

APPLICATION FILED JULY 23, 1920.

Reissued Feb. 15, 1921.

15,040.

2 SHEETS—SHEET 2.

Inventor
CHARLES S. FRANKLIN

By his Attorney Graf Adams

UNITED STATES PATENT OFFICE.

CHARLES S. FRANKLIN, OF LONDON, ENGLAND, ASSIGNOR, BY MESNE ASSIGNMENTS, TO RADIO CORPORATION OF AMERICA, A CORPORATION OF DELAWARE.

AERIAL CONDUCTOR FOR WIRELESS TELEGRAPHY.

15,040. Specification of Reissued Letters Patent. Reissued Feb. 15, 1921.

Original No. 1,322,101, dated November 18, 1919, Serial No. 82,042, filed March 4, 1916. Application for reissue filed July 23, 1920. Serial No. 398,539.

DIVISION A.

*To all whom it may concern:*

Be it known that I, CHARLES SAMUEL FRANKLIN, a subject of the King of Great Britain, residing at Marconi House, Strand, London, England, have invented new and useful Improvements in or connected with Aerial Conductors for Wireless Telegraphy, of which the following is a specification.

The object of this invention is to provide an improved wireless aerial system which shall be particularly suitable for a receiving station used in conjunction with but separated from a transmitting station for duplex telegraphy.

It is known that an aerial system consisting of two frames at right angles to each other, and used in connection with a radio-goniometer, can receive best from any two opposite directions and eliminate signals from any two opposite directions at right angles to the first.

According to this invention, two similar directional aerial systems, each consisting of two vertical frames at right angles to one another, are erected at equal distances from an adjacent transmitting station and at a distance apart in the direction of motion of the wave being received which is a considerable fraction of the wave length it is desired to receive. The moving coil of the radio-goniometer connected to each directional aerial system is connected to a pair of wires leading to the receiving apparatus which is preferably arranged midway between them. Condensers are introduced into the circuits comprising the leading wires, the moving coils of the radio-goniometers, and the coils of the receiving apparatus in order to tune them to the desired wave.

Figure 1:
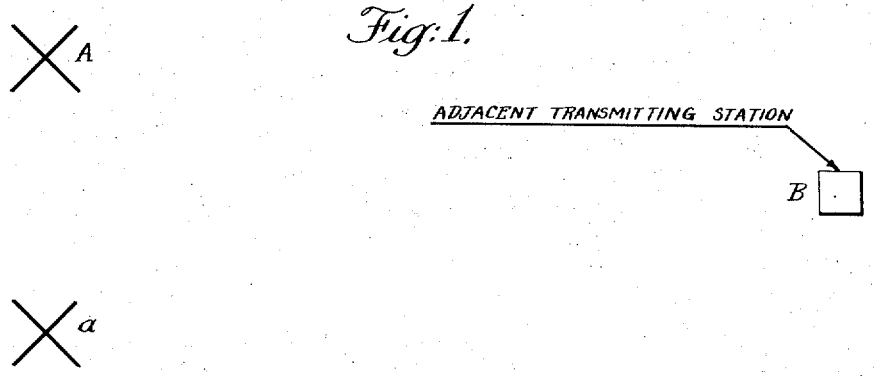
Figure 2:
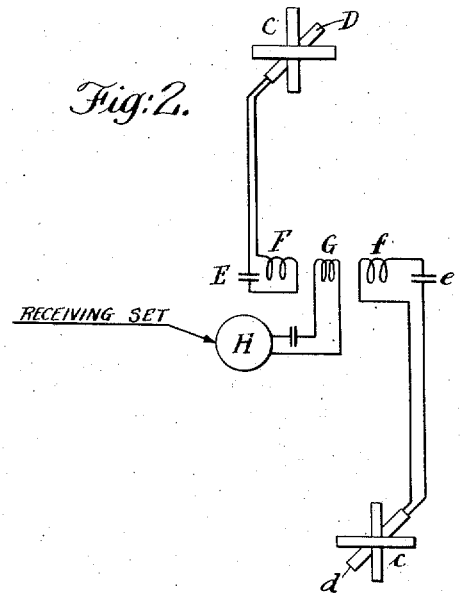
Figure 3:
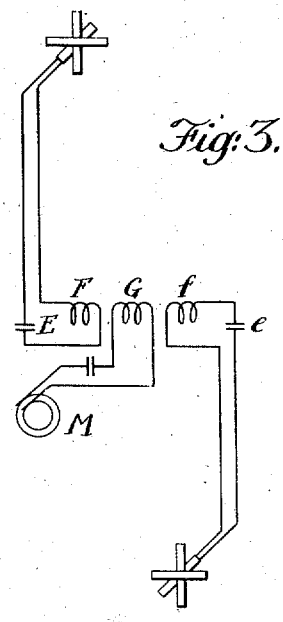
Figure 4:
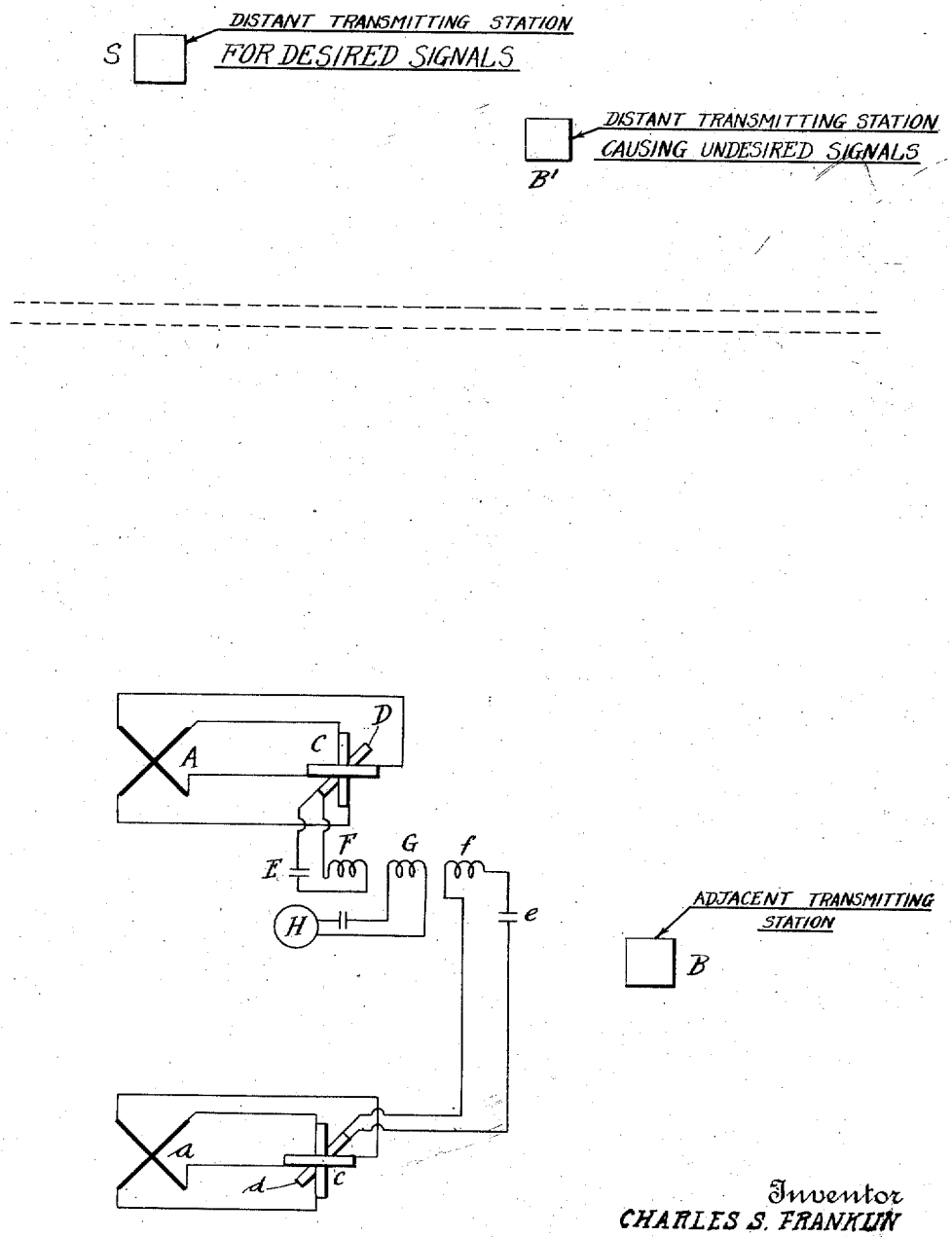

The invention is illustrated by the accompanying diagrams, in which Figure 1 shows a preferred relation between the receiving station and the adjacent transmitting station; Fig. 2 shows circuits which I may employ at a receiving station in accordance with one form of my invention; Fig. 3 shows circuits which I may employ at a transmitting station, and Fig. 4 shows the preferred arrangement of the entire system.

In Fig. 1, A, *a* are two aerial or antennæ systems each consisting of two equal vertical frames at right angles to each other. They are situated at equal distances from an adjacent transmitting station B which may have any type of transmitting aerial, and the distance between them is a considerable fraction of the wave length it is desired to receive.

Presuming the station is arranged so that the direction of the received signals coincides with the line joining A, *a*, then the maximum receiving power of the combination is obtained when A and *a* are placed at a distance equal to one-half of the received wave length.

It is, however, generally more useful to place them at a distance apart equal to one quarter of the received wave length.

Although it is advisable to arrange A, *a* in the line of the desired communication, considerable variation from this can be allowed.

In Fig. 2, C, *c* are two radio-goniometers the fixed coils of which are connected in the usual way to aerial or antennæ systems A, *a* respectively.

The moving coils D, *d* of the radiogoniometer are connected through tuning condensers E, *e* to coils F, *f* arranged to act upon a common coil G which is connected up to the receiving apparatus H through the necessary tuning appliances.

As the directional systems A, *a* are at equal distances from the transmitting station B, the oscillations produced in them by waves from B will be equal and in phase provided all the circuits are correctly tuned; then if the coils D, *d* are set at equal angles and the couplings between F, G, and *f*, G are equal and opposite, no effect will be produced in the receiving apparatus H.

With these adjustments waves coming from any direction differing appreciably from the direction to or away from B will not produce opposing effects as the oscillations resulting in the two systems A, *a* will not be in phase.

To eliminate signals from any desired direction other than that of B, it is only necessary to set the coils D, *d* respectively, to the angle at which the oscillations produced in the two frame aerials of each system A, *a*, neutralize each other in their effects upon these coils.

The result is that this construction provides a receiving system which will not be affected by waves coming from four different directions, two of which are fixed relatively to the station and two of which are controllable.

The invention can also be used in another way, *i. e.*, supposing the radiogoniometer coils A and *a* are set to eliminate waves from B and that A and *a* are a quarter wave length apart, then waves coming in the line joining A and *a* will produce in the circuits connected to the radiogoniometers oscillations which are out of phase 90 degrees. If these circuits have their respective capacities and inductances adjusted in opposite senses so that the phases of the oscillations in the two circuits are advanced and retarded 45 degrees, respectively, then waves coming from one direction will produce in the circuits oscillations which oppose, and waves coming from the other direction will produce oscillations which are in phase. This arrangement is not claimed herein, however, but is claimed in my copending divisional reissue application, Serial No. 398,540.

A similar construction can be applied to a transmitting station. In this case suitable radiogoniometers capable of dealing with the energy are connected to two aerial systems similar to A, *a*, and the moving coils of the radiogoniometers are supplied with high frequency alternating currents from an alternator or other source such as indicated at M in Fig. 3. Then if the adjustments of the radiogoniometers are similar, the system will not radiate waves in the directions at right angles to the line joining the two aerial systems nor in two opposite directions determined by the setting of the moving coils of the radiogoniometers.

In the operation of the radio system, according to my invention as illustrated in Fig. 4, the antennæ A, *a* of the receiving station are arranged in line with the distant station S from which it is desired to receive most frequently. When receiving from S in this arrangement the circuits containing coils D, *d* being adjusted so that the phase angle between the current and electromotive force in one is equal to that between the current and electromotive force in the other, the transmitting station B may be operated at the same time provided only the coils D, *d*, are set at equal angles as previously mentioned, since the adjacent transmitting antenna B is equally distant from A and *a* and the coils F and *f* are coupled to coil G in opposition. The currents caused in D, *d*, by waves from B being thus equal and of opposite effect, receiver H is not affected. Consequently, the operator is still free while station B is operating, to turn coils D, *d*, to bring them into the planes of fields set up in the goniometers C, *c* by a third set of waves and thus to exclude undesired signals from a third station, such as B′, operating at the same wave length as S and B, which may be a distant station, and which lies not too close to the line S, A, *a*. If the station B′ approaches too close to the line S A *a* difficulty arises due to the fact that the fields in the goniometers C, *c* due to waves from S and B′ lie in almost the same plane and a setting of the coils D, *d* which eliminates the undesired signals from B′ necessarily eliminates most of the desired signals from S. The station B′ may be on either side of the line through B at right angles to line A, *a* without affecting the results just stated, the order in which the signal waves affect antennæ A, *a*, being immaterial in this form of the invention. Moreover, the coils D, *d* may be set to eliminate the signals from S and to receive those from B′ in case circumstances should render this desirable.

It will be seen that my invention comprises a novel arrangement including a plurality of spaced directive antennæ associated with means whereby the system may discriminate between waves moving in either direction on three diverging lines, and I believe that I am the first to accomplish this result. Evidently, the positions of stations S and B′ may be interchanged also without affecting the results stated.

It will be seen, moreover, that the novel results hereinbefore set forth are in addition to and in no wise exclusive of the methods of preventing interference by tuning as practised prior to my invention.

What I claim is:

1. A radio receiving station comprising an antenna system having directive portions separated by an appreciable fraction of a wave length in the general direction of desired reception, and a local circuit comprising a receiver associated with said portions.

2. At a radio station, an antenna system having similar directive portions having an effective separation of an appreciable fraction of a wave length in the general direction of desired reception, a local circuit and means associating said local circuit and said directive portions for giving the combined structure when in use directive properties different from those of either portion alone.

3. At a radio station, an antenna system having directive portions arranged in alinement in the direction of desired reception, and effectively separated by an appreciable fraction of a wave length, a local circuit, a circuit associated with each of said alined antenna system portions and with said local circuit, and adjustable means whereby the combined system has directive properties different from those of said directive portions alone.

4. In a radio receiving apparatus, duplicate means having an effective separation of an appreciable fraction of a wave length for receiving desired signals successively as currents displaced in phase and undesired signals as currents having different phases, magnetic field producing means associated with each of said duplicate means, and a local circuit associated with said last named means.

5. In a radio receiving apparatus, a plurality of directive antennæ having an effective separation in the direction of desired reception as great as approximately one quarter wave length of the desired signals, a local receiving circuit, magnetic field producing means associated with each of said antennæ and with said local circuit, an angularly adjustable coil in each field producing means affected by said field and effecting an adjustment of current in said local circuit and means associated with said local circuit for detecting signal currents therein.

6. The combination at a wireless station of two similar aerials, each consisting of two vertical frames at right angles to one another, two radiogoniometers connected thereto and a common circuit inductively coupled to the moving coils of the two goniometers.

7. The combination at a wireless station of two similar aerials, each consisting of two vertical frames at right angles to one another, two radiogoniometers connected thereto, a common receiving circuit inductively coupled to the moving coils of the two goniometers and an adjacent transmitting station equidistant from the two aerials.

8. The combination at a wireless receiving station of two similar aerials situate at a distance apart equal to a quarter of the wave length of the waves to be received and each consisting of two vertical frames at right angles to one another, two radiogoniometers connected thereto, and a common receiver inductively coupled to the moving coils of the two goniometers.

9. The combination at a wireless receiving station of two similar aerials situate at a distance apart equal to a quarter of the wave length of the waves to be received and each consisting of two vertical frames at right angles to one another, two radiogoniometers connected thereto, a common receiving circuit inductively coupled to the moving coils of the two goniometers and an adjacent transmitting station equidistant from the two aerials.

10. The combination at a wireless station of two similar directive aerials spaced apart, said aerials each having a plurality of aerial sections, which form parts of distinct circuits, and a common circuit inductively coupled to said aerials.

11. The combination at a wireless station of two similar directive aerials situate at a distance apart equal to a fraction of the wave length of the waves to be received, each of said aerials having a plurality of aerial sections which form parts of distinct circuits, and a common circuit inductively coupled to said aerials.

12. The combination at a wireless station of two similar directive aerials situate at a distance apart equal to a quarter of the wave length of the waves to be received, and a common circuit inductively coupled thereto.

13. The combination at a receiving station of two similar directive aerials situate a distance apart equal to a fraction of the wave length of the waves to be received, each of said aerials having a plurality of aerial sections which form parts of distinct circuits, a common receiver inductively coupled to said aerials, and an adjacent transmitting station equidistant from the two aerials.

14. The combination at a wireless station of two similar aerials, each consisting of two vertical frames at right angles to one another, two radiogoniometers connected thereto, and common receiving means inductively coupled to the moving coils of the two goniometers.

15. The combination at a receiving station of two similar aerials each consisting of two vertical frames at right angles to one another, two radiogoniometers connected thereto, receiving means inductively connected to the moving coils of the two goniometers, and an adjacent transmitting station equidistant from the two aerials.

16. The combination at a wireless receiving station of two similar aerials situate at a distance apart equal to a fraction of the wave length of the waves to be received, and each consisting of two vertical frames at right angles to one another, two radiogoniometers connected thereto, and common receiving means inductively coupled to the moving coils of the two goniometers.

17. The combination at a wireless receiving station of two similar aerials situate at a distance apart equal to a quarter of the wave length of the waves to be received, and each consisting of two vertical frames at right angles to one another, two radiogoniometers connected thereto, receiving means inductively coupled to the moving coils of the two goniometers, and an adjacent transmitting station equidistant from the two aerials.

18. The combination at a wireless station of two similar directive aerial systems whose centers are spaced apart, each of said aerial systems comprising a plurality of horizontally extending aerial sections arranged approximately parallel to aerial sections of the other aerial system and a common circuit inductively coupled to said aerial systems.

19. The combination at a wireless station of two similar directive aerial systems whose centers are situated at a distance apart equal to a fraction of the wave length of the waves to be received, each of said aerial systems comprising a plurality of horizontally extending aerial sections arranged approximately parallel to aerial sections of the other aerial system, and a common circuit inductively coupled to said aerial systems.

20. The combination at a receiving station of two similar directive aerial systems whose centers are situated a distance apart equal to a fraction of the wave length of the waves to be received, each of said aerial systems comprising a plurality of horizontally extending aerial sections arranged approximately parallel to aerial sections of the other aerial system, and a common receiver inductively coupled to said aerial systems, and an adjacent transmitting station equidistant from the two aerials.

21. The combination in a radio system of two directive antennæ spaced apart an appreciable portion of a wave length in the direction of desired signal reception, and means associating said antennæ in a single antenna system for adjusting said system to render it unresponsive toward waves moving at right angles to the line of the signals and also unresponsive to waves in a line differing from the line of the signals.

C. S. FRANKLIN.